June 29, 1965    A. R. McCLOSKEY    3,191,265
METHOD OF MAKING SELF-ALIGNING BEARINGS
Filed Jan. 29, 1963

INVENTOR.
ALBERT R. McCLOSKEY
BY Davis, Hoxie, Faithfull & Hapgood
ATTORNEYS.

United States Patent Office 3,191,265
Patented June 29, 1965

3,191,265
METHOD OF MAKING SELF-ALIGNING
BEARINGS
Albert R. McCloskey, Fairfield, Conn., assignor to The Heim Universal Corporation, a corporation of Delaware
Filed Jan. 29, 1963, Ser. No. 254,646
3 Claims. (Cl. 29—149.5)

This application is a continuation-in-part of my prior application Serial No. 44,763, filed July 22, 1960.

The present invention relates to a method of producing self-lubricating self-aligning bearings and more particularly to a method for producing such bearings having as their lubricant a solid plastic member between the inner and outer members.

At the present time many self-aligning bearings comprise an inner and an outer metal member with a replenishing source of fluid lubricants. To avoid maintenance and bearing failure due to a shortage of fluid, various types of self-aligning bearings have been proposed. In one type, an intermediate member of woven plastic is glued to the outer member and the inner and outer members are assembled and formed by swaging. Such woven material is thin and relatively difficult to apply. In another type, a hole is drilled through the outer member and liquid plastic is poured in to fill the gap between the inner and outer members. The cooled plastic forms a solid lubricating intermediate member; however, the hole weakens the bearing and the method is relatively slow.

It is the objective of the present invention to produce a self-lubricating self-aligning bearing having a relatively thick lubricating intermediate member by a method which is relatively inexpensive and rapid, which has superior dimensional control, which requires a minimum of applied force, and which requires a minimum of manufacturing steps.

In accordance with the present invention, the inner member is preformed, that is, before it is assembled with the outer member it possesses the general shape it will have in its final assembly. The outer member is of ductile material. Before assembly, a lubricating plastic capable of cold flow is inserted in tubular form in the gap between the outer and inner members, the outer member being sufficiently larger in diameter than the inner member to allow the inner member and the plastic tube to be moved into telescoped relation with the outer member. After the three members are in telescoped relation, the outer member is deformed by pressure on its outer surface so that the space between the members is diminished. Because of its cold flow properties, the plastic occupies most or all of the space between the members. In one embodiment of the present invention, the outer member is preformed and radial pressure is applied to its outer surface to diminish the space between the members throughout the length of the space.

With the foregoing and other objectives in view, I have devised the novel method as illustrated in the accompanying drawings forming a part of this specification.

Figure 1:
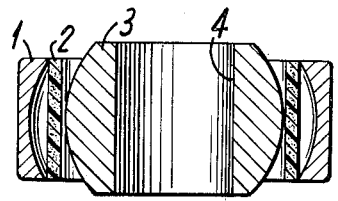
FIG. 1 is a side sectional view of a self-aligning bearing prior to assembly.

As shown in FIG. 1, the unassembled parts of the self-aligning bearing in the first embodiment are the outer member 1, shaped like a ring and having a concave inner surface; the lubricating intermediate plastic member 2 in the shape of an axial segment of a hollow cylinder, that is, a tubular segment; and the inner member 3 having a convexly curved outer surface and a hole 4 through it. The outer member 1 may be an individual race member of a bearing, a rod end or other machine element. As shown in FIG. 1, the plastic tube 2 is placed within the gap between inner member 3 and outer member 1 when the parts are telescoped prior to assembly. The plastic is capable of cold flow and is sufficiently rigid and strong to withstand the stresses of the forming step and later use. A preferred material is a solid mixture of tetrafluoroethylene (Teflon) and carbon particles. The tube is formed from a sheet and placed in the gap with the axial ends of the tube unjoined. The axial ends of the tube are joined in the contractive assembly of the bearing.

Figure 2:
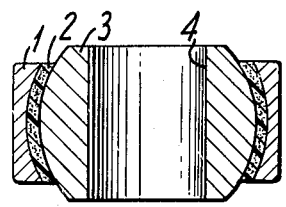
FIG. 2 is a side sectional view of the bearing of FIG. 1 subsequent to assembly according to the present invention.
Figure 4:
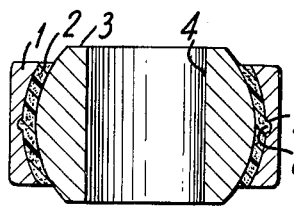
FIG. 4 is still another embodiment of the assembled bearing, this embodiment having a retaining groove.

After the outer member 1 has been contracted radially so that the material of member 1 and intermediate member 2 cold flows under the pressure, the bearing is as shown in FIG. 2. The amount of contraction is controlled so that there is a tight fit between outer member 1 and intermediate member 2 and a fit having bearing tolerance between the intermediate member and the inner member.

Figure 3:
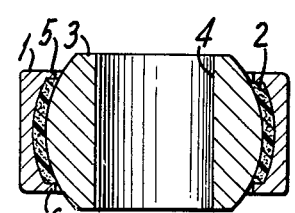
FIG. 3 is another embodiment of the assembled bearing, this embodiment having retaining lips.

In order to avoid rotation of the intermediate member relative to the outer member 1, a number of measures may be used. For example, with the bearing of FIGS. 1 and 2, a metal-to-plastic glue may be applied on the outer surface of the tube of member 2 prior to contraction. As another example, retaining lips 5 and 6, as shown in FIG. 3, may be added on the top and bottom of the outer member 1. As still another example, a circular retaining groove 7 may be machined in the inner concave face of member 1. During assembly, the intermediate member cold flows and fills the groove with its protrusion 8.

Figure 5:
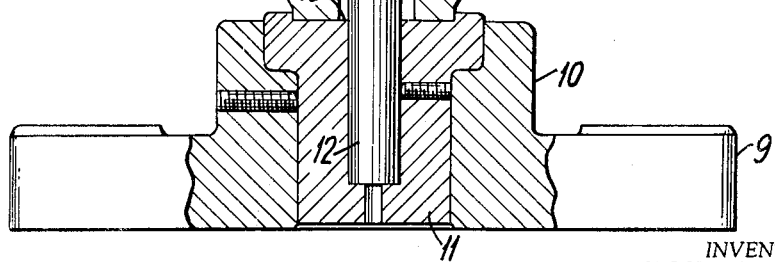
FIG. 5 is a vertical section through a contraction device used in the method of the present invention.

As shown in FIG. 5, the device for contractive assembly of the bearing includes a base 10 having legs 9 and a circular cavity. A mounting member 11, having a cavity, is fixed within the cavity of base 10 and a pedestal 12 is vertically mounted in the cavity in mounting member 11. An outer die 14, having a tapering inner wall 15, is adapted for axial movement over the top and sides of pedestal 12. Die 14 has its mouth portion 16 wider than its top portion 17. Die 14 is mounted by screw member 18 to a ram (not shown) so that it can be raised and lowered.

At the top of pedestal 12 are a ring-like rim 30 and a ring-like shelf 19 and a cavity 20, all circular and all adapted for the particular size of bearing to be produced. A pin 21 fits within the cavity 20 and also fits within a cavity 22 in the hold-down member 23.

At the end of contraction, member 23 coins the top face of outer bearing member 1 by pressing against it with a total force, for a bearing having an outside dimension of one-half of an inch, of 6–10 tons. Such pressure forces member 23 upward into cavity 25 against spring 24. Member 23 is held in its top position by finger 26 then being inserted, by spring 27 under flange 28 of member 23. Finger 26 is attached to handle 29 and may be withdrawn from under flange 28 by operation of the handle.

In the operation of contracting the outer member 1, the inner member 3 with hole 4 in it is placed on the shelf 19. The inner member 3 is then secured against horizontal movement by the pin 21 which fits within hole 4. Downward vertical movement of the inner member 3 is prevented by the shelf 19. The intermediate member 2 and the outer member 1 are placed telescopically on rim 30. The die 14 is then positioned so that its mouth portion 16 surrounds the outer member 1. The die 14 then descends, forced downwardly by the ram. If the outside diameter of member 1 is about two inches, the pressure is 8–12 tons. Outer member 1 is caused to contract radially inward by radial pressure imparted from the tapered wall 15. This contraction of outer member 1 against intermediate member 2 and inner member 3 assembles the bearing with the proper tolerance when the spring-back of the metal after removal from the die is taken into account. The last portion of the downward stroke of die 14 coins the top and bottom of outer member 1 by pressing it between member 23 and rim 30. During coining, radial expansion of the outer member is not prevented by the die. After removal from the apparatus, the bearing may be loosened by pressure about its rim. The bearing may be made so exactly that this loosening step is not necessary.

The contractive step positively locks the three members together so that, absent further distortion, nothing can fall out.

Figure 7:
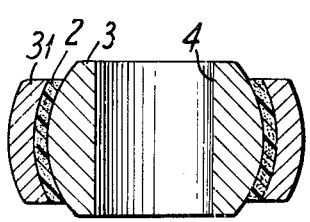
FIG. 7 is a side sectional view of the bearing of FIG. 6 subsequent to assembly according to the present invention.
Figure 6:
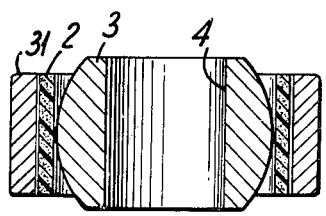
FIG. 6 is a side sectional view of another type of self-aligning bearing prior to assembly.

As shown in FIG. 6, the unassembled parts of the second embodiment are the ductile outer ring 31, in the shape of a cylinder; the lubricating intermediate plastic member 2, also in the shape of a cylinder; and the inner member 3 having a convexly curved outer surface and a hole 4 through it. The assembly is placed in a swaging die (not shown) and the outer member and the intermediate member placed under pressure so that they cold flow. After swaging, the bearing is as shown in FIG. 7. If desired, the outer surface of the outer member may be machined or ground so that its outer surface has a straight wall. The same measures against rotation of the intermediate member relative to the outer member may be used as in the first embodiment.

I claim:

1. The process of producing a self-aligning self-lubricating bearing including the steps of preforming an inner member having a convex outer face, preforming a ringlike outer member having a concave inner face, forming an intermediate member of lubricating cold flowable plastic material, telescoping the three members, placing the telescoped members in a tapered reducing die, diminishing the space between the members throughout the length of the outer member by exerting radial contractive pressure on the outer member and thereby contracting the outer member and the intermediate member, and coining the top and bottom of the outer member between coining members while the outer member is free to expand radially.

2. The process of claim 1 in which the intermediate member is composed substantially of tetrafluoroethylene.

3. The process of claim 1 in which the intermediate member is in the form of a tube prior to the diminishing of the space.

References Cited by the Examiner

UNITED STATES PATENTS

| | | | |
|---|---|---|---|
| 2,958,927 | 11/60 | Kravats | 29—149.5 |
| 2,995,813 | 8/61 | Board | 29—441 |
| 3,068,552 | 12/62 | Williams et al. | 29—149.5 |
| 3,085,312 | 4/63 | Evans | 29—149.5 |

WHITMORE A. WILTZ, *Primary Examiner.*

THOMAS H. EAGER, *Examiner.*